United States Patent [19]

Behrens et al.

[11] Patent Number: 5,179,870

[45] Date of Patent: Jan. 19, 1993

[54] SHIFT CONTROL LEVER ASSEMBLY

[75] Inventors: William L. Behrens, Ortonville; Arthur Anderson, Clarkston, both of Mich.

[73] Assignee: Chrysler Corporation, Highland Park, Mich.

[21] Appl. No.: 807,818

[22] Filed: Dec. 16, 1991

[51] Int. Cl.⁵ .................. G05G 1/06; F16H 59/10
[52] U.S. Cl. .................. 74/475; 74/473 R; 74/501.6
[58] Field of Search .......... 74/523, 524, 527, 531, 74/543, 545, 557, 473 P, 473 R, 475

[56] References Cited

U.S. PATENT DOCUMENTS

| | | | |
|---|---|---|---|
| 3,998,109 | 12/1976 | O'Brien | 74/501.6 X |
| 4,078,447 | 3/1978 | Kato et al. | 74/475 |
| 4,191,064 | 3/1980 | Houk et al. | 74/475 |
| 4,565,151 | 1/1986 | Buma | 74/473 R X |
| 4,612,820 | 9/1986 | Behrens | 74/523 X |
| 4,774,850 | 10/1988 | Shovlin | 74/473 R X |

Primary Examiner—Leslie A. Braun
Assistant Examiner—Khoi Q. Ta

[57] ABSTRACT

A shift control lever assembly for use with a transmission shift control mechanism, wherein the assembly includes a palm abutting knob housing an actuating assembly secured to an operating button extending from an end of the palm abutting knob. A push rod extends downwardly from the latter for actuating the shift control mechanism. A ramp is formed on the actuating assembly, and a ball is rotatably mounted at the top end of the push rod for cooperation with the ramp to urge the push rod downwardly upon manual depression of the operating button.

8 Claims, 5 Drawing Sheets

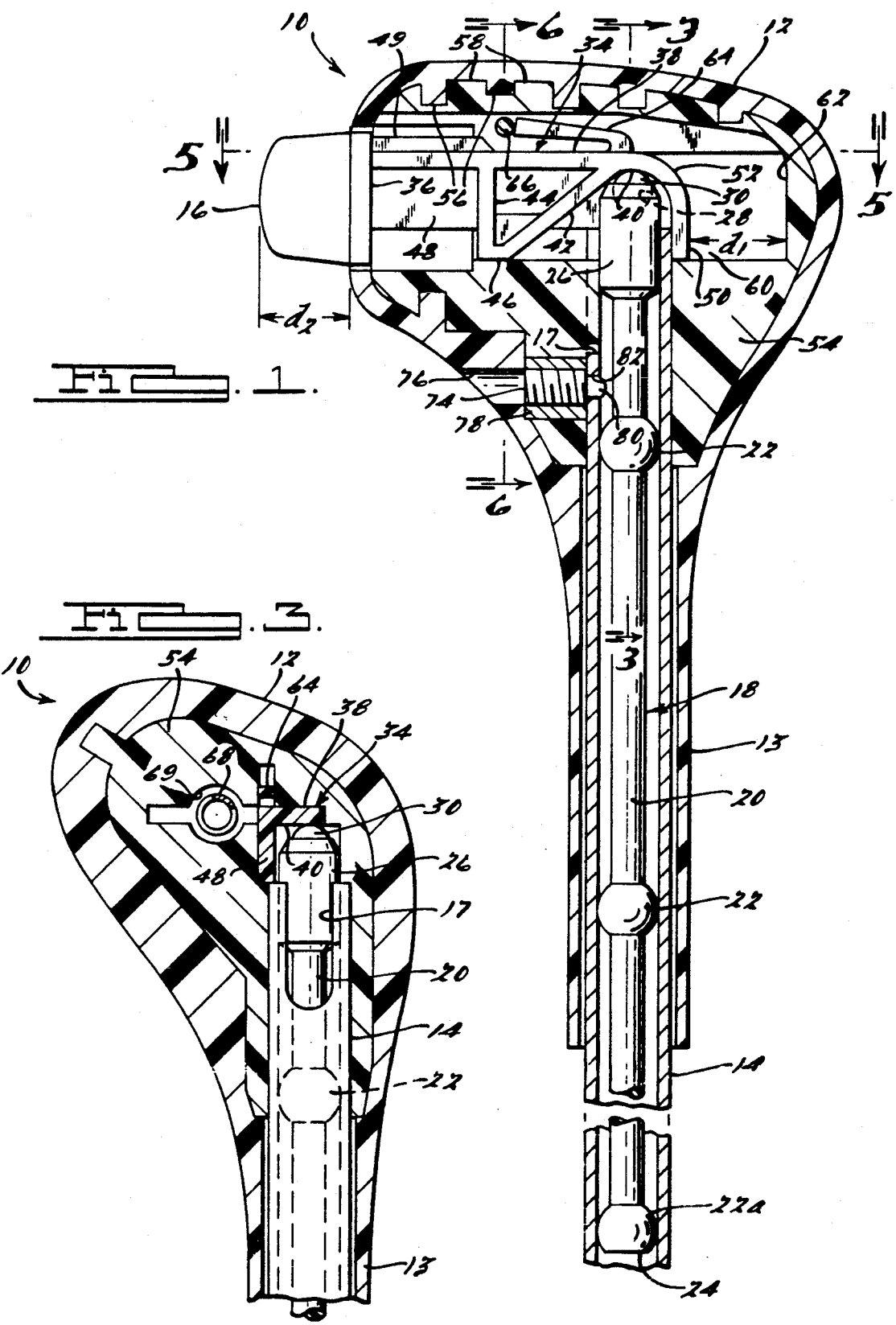

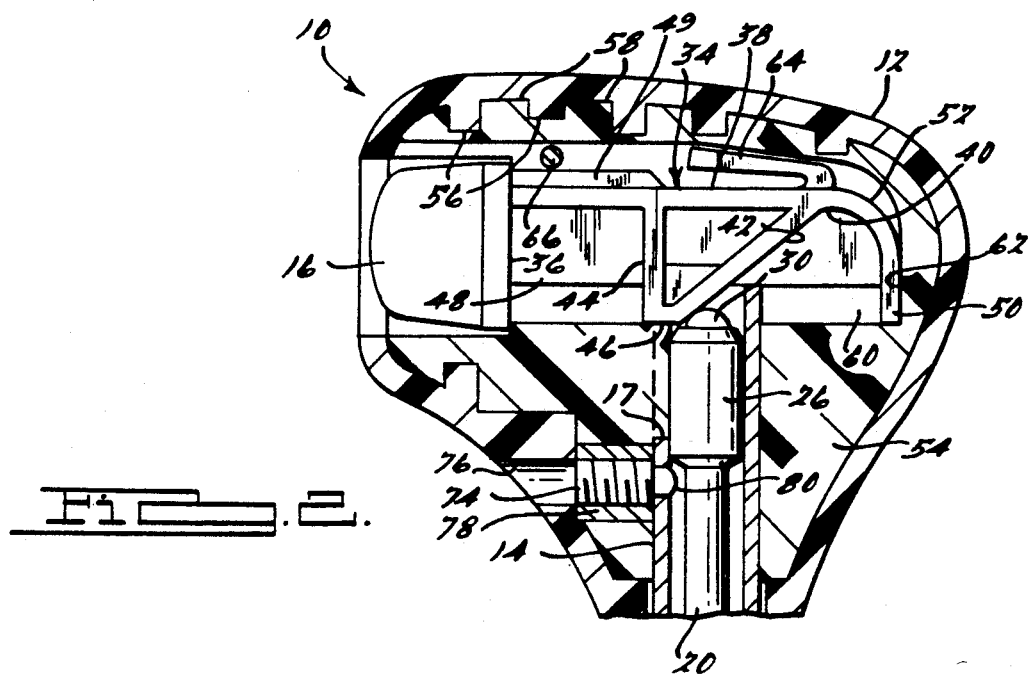
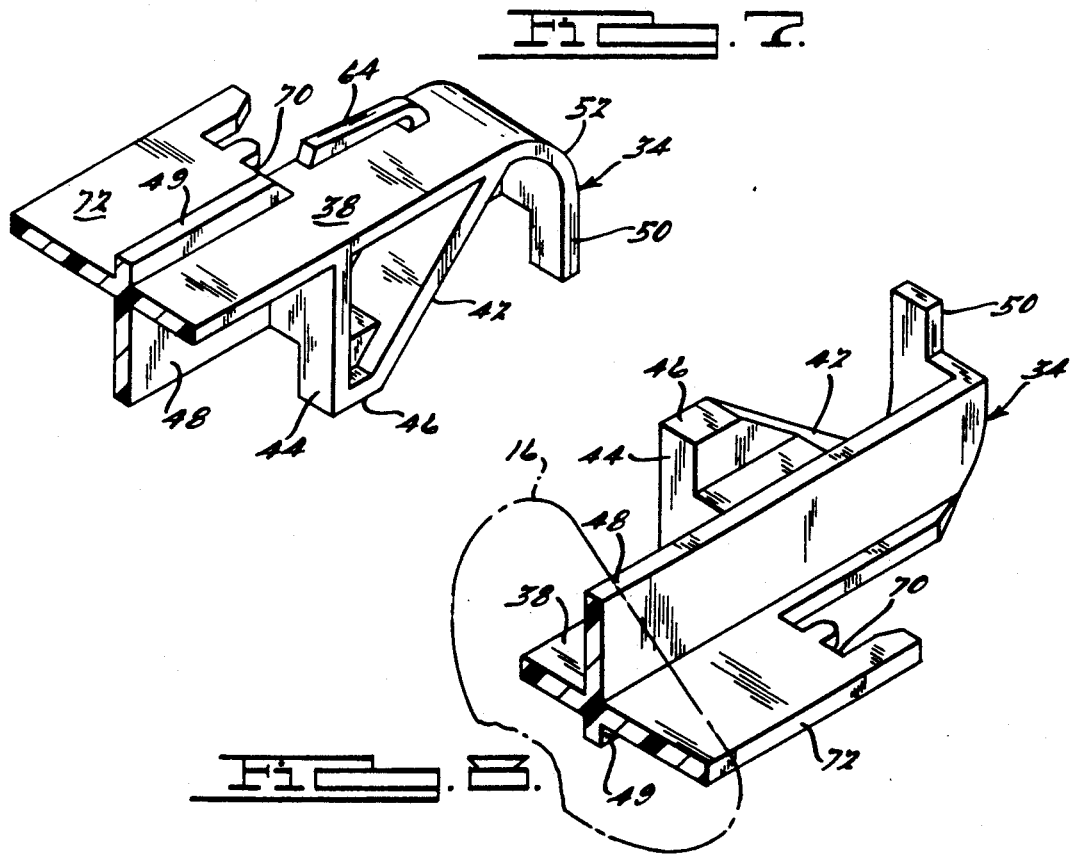

SHIFT CONTROL LEVER ASSEMBLY

TECHNICAL FIELD

This invention relates generally to transmission shift control mechanisms and, more particularly, to shift control lever assemblies having palm abutting knobs associated therewith.

BACKGROUND ART

Heretofore, transmission shift control palm abutting knobs of shift lever assemblies have included operating buttons extending from a side face thereof, for example, Kubota et al U.S. Pat. No. 4,612,820 and Kobayashi et al U.S. Pat. No. 4,884,668. Each includes an elongated push rod having a tapered cam surface formed on the top end thereof adapted to being pushed downwardly by the inward push of the operating button by the vehicle operator.

O'Brien U.S. Pat. No. 3,998,109 discloses in one embodiment thereof a sidewardly extending operating button adapted to move a curved sloped cam surface formed on an inner extension thereof into sliding engagement with an enlarged rounded cam end of an elongated pivotable cam lever, to thereby push down on a flexible detent rod.

DISCLOSURE OF THE INVENTION

A general object of the invention is to provide an improved vehicle shift control lever assembly.

Another object of the invention is to provide a shift control lever assembly having a palm abutting knob incorporating improved means for depressing a push rod operatively associated with a shift control mechanism.

A further object of the invention is to provide a shift control lever assembly having a palm abutting knob assembly wherein a side operating button slidably moves an internal ramp segment to efficiently force a ball end of a push rod downwardly against the force of a spring in a shift control mechanism to permit a transmission shift selection to be made in the latter by fore and aft movement of the shift control lever.

These and other objects and advantages will become more apparent when reference is made to the following drawings and the associated description.

BRIEF DESCRIPTION OF THE DRAWINGS

FIG. 1 is a side elevational view in cross-section of a palm abutting knob embodying the invention;

FIG. 2 is a fragmentary view similar to FIG. 1, showing components of the palm abutting knob in a different operational position;

FIG. 3 a cross-sectional view taken along the plane of the line 3—3 of FIG. 1, as if FIG. 1 were a full round assembly, and looking in the direction of the arrows;

FIGS. 7 and 8 are perspective views of a portion of the FIG. 1 structure from the top and bottom directions;

BEST MODE OF CARRYING OUT THE INVENTION

Figure 5:
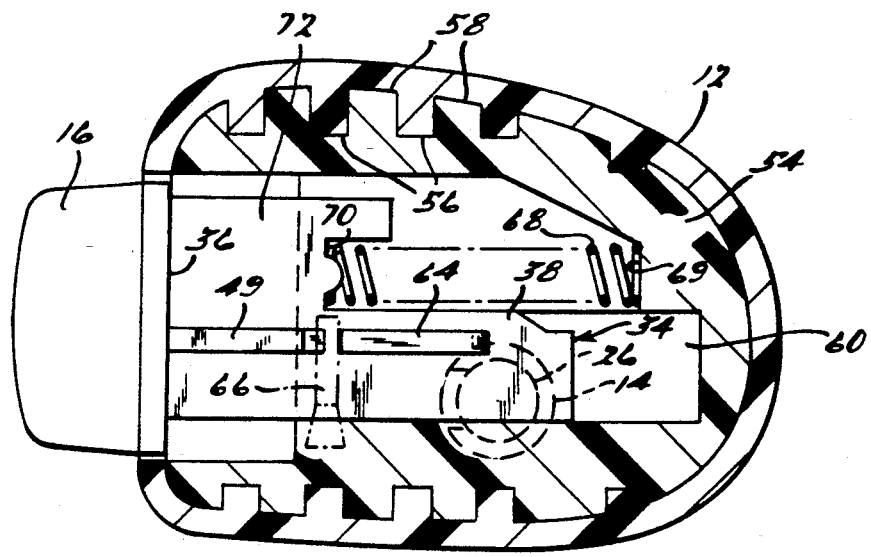
FIG. 5 is a cross-sectional view taken along the plane of the line 5—5 of FIG. 1, as if FIG. 1 were a full round assembly, and looking in the direction of the arrows.
Figure 6:
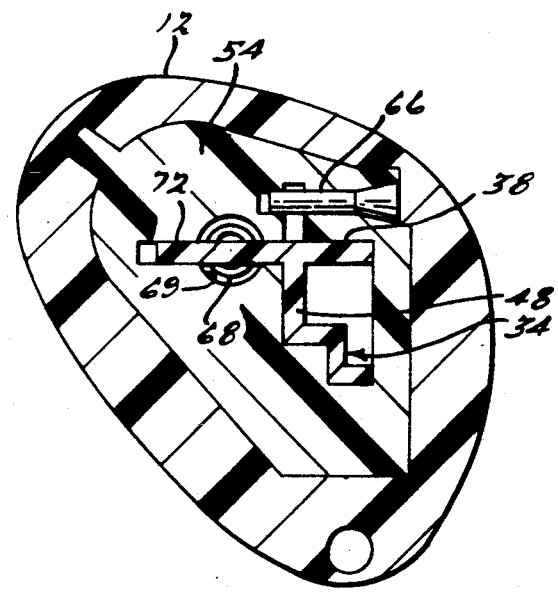
FIG. 6 a cross-sectional view taken along the plane of the line 6—6 of FIG. 1, as if FIG. 1 were a full round assembly, and looking in the direction of the arrows.

Referring now to the drawings in greater detail, FIG. 1 illustrates a transmission shift lever assembly 10 including a palm abutting knob 12 and integrally molded hollow stem 13 mounted on and around an elongated cylindrical shift lever 14 of a vehicle transmission control mechanism with a substantially oval-shaped operating member or button 16 extending from the left end of the knob 12. A cut-out portion 17 (FIGS. 2 and 3) is formed at one side of the upper end of the cylindrical shift lever 14, for purpose to be described.

A push rod 18 is slidably mounted within the cylindrical shift lever 14. The rod 18 comprises a solid stem 20, smaller in diameter than the inside diameter of the cylindrical shift lever 14, with spherical portions 22 integrally formed at predetermined spaced positions along the stem 20 for slidable cooperation with the inside surface of the cylindrical shift lever 14. The lowermost spherical portion 22a has a flat surface 24 formed thereon, adapted to being biased upwardly by a spring (not shown). A chamfered cylindrical member 26 is formed on the upper end of the stem 20, also adapted to having a slidable relationship with the inside surface of the cylindrical shift lever 14 at the upper end of the latter.

Figure 4:
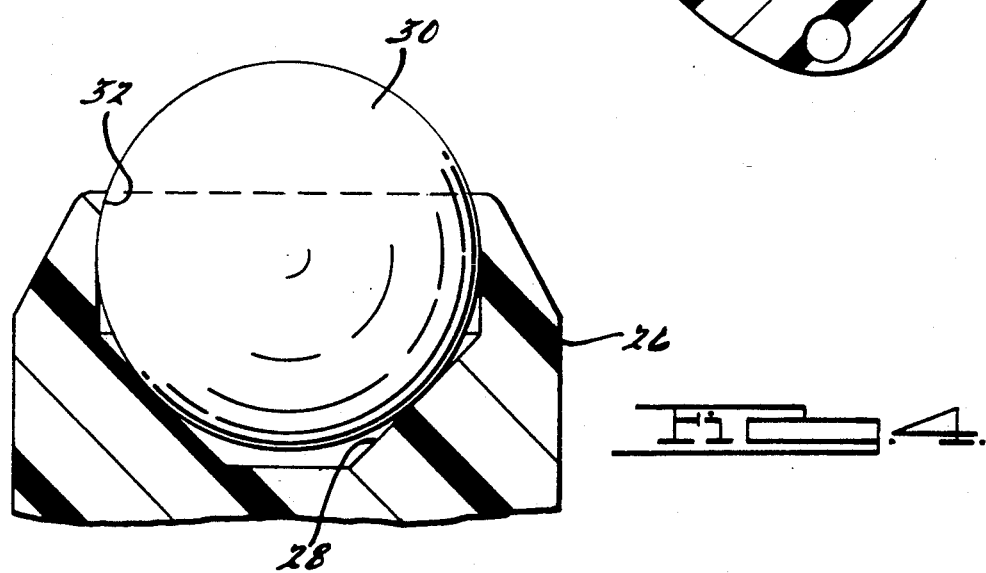
FIG. 4 is an enlarged fragmentary cross-sectional view of a portion of the FIG. 1 structure.

A pocket 28 is formed in the outer end of the member 26. A ball 30 is rotatably mounted in the pocket 28 of the member 26, as better seen in FIG. 4. The outer end of the chamfered cylindrical member 26 is formed to include an inner peripheral in-turned edge 32 having a diameter slightly smaller than the outside diameter of the ball 30, serving to retain the ball in the pocket 28.

An actuating structure assembly 34, better seen in FIGS. 7 and 8, is integrally molded with and extends from the inner face 36 of the operating button 16 toward the right end of the knob 12. The assembly 34 is formed to include a flat strip 38 extending to a location just past the ball 30. The latter is abutted against the bottom surface 40 of the strip 38. A ramp segment 42 is integrally formed to extend from the surface 40 adjacent the ball 30, downwardly and toward the button 16 on approximately a 45° angle. A brace segment 44 extends from a short flat segment 46 adjacent the lower end of the ramp segment 42 vertically upwardly to the flat strip 38. A vertical structural support wall 48 (FIGS. 7 and 8) is formed along the length of the flat strip 38 adjacent a edge thereof substantially at the center of the face 36. A rib 49 is formed on the strip 38 from above the brace segment 44 to the inner face 36 of the button 16. A further brace segment 50 extends downwardly from a rounded inner end 52 of the flat strip 38 to a location adjacent the upper end of the cylindrical shift lever 14.

As shown in FIG. 1, a plastic filler 54 is integrally molded within the knob 12, secured by a plurality of interlocking alternate ribs 56 and 58. The filler 54 is formed to include a passageway 60 in which the actuating structure assembly 34 is slidably mounted. The length of the passageway 60 is such that the brace segment 50 can move to the right in FIG. 1 a distance $d_1$, substantially equal to the length $d_2$ of the operating button 16 to an abutment 62 formed in the plastic filler 54.

An arm 64 is formed on the surface 38 of the assembly 34, extending toward the button 16 and adapted to, at times, abut against a fixed pin 66.

As shown in FIG. 5, a coil spring 68 is mounted between a spring seat surface 69 formed in the filler 54 beyond the brace segment 46 and a spring seat 70 formed on the inner end of a flat segment 72 which is formed as a lateral extension of a side portion of the flat strip 38, and an extension from the inner face 36 of the operating button 16.

A set screw 74 is mounted through an opening 76 formed through the wall of the knob 12 and, thence, threadedly mounted through a threaded insert 78 molded in the plastic filler 54, such that a projection 80 on the inner end of the set screw 74 extends through an opening 82 formed through a wall of the cylindrical shift lever 14, to prevent the latter from rotating within the hollow stem 13.

Once the shift lever assembly 10 is mounted on the shift control mechanism, the actuating structure assembly 34 is retained in the position shown in FIG. by the abutting relationship between the brace segment 50 and the shift lever 14, and the upward force of the push rod 18 retains the ball 30 in contact with the surface 40. In other words, engagement of the arm 64 against the fixed pin 66 is necessary only during shipment of the assembly 10, prior to installation, to retain the operating button 16 and the assembly 34, and the spring 68 within the palm abutting knob 12.

In operation, when the vehicle operator grips the palm abutting knob 12 and with his or her thumb pushes the operating member or button 16 inwardly to the abutment 62, through the distance $d_2$, the ramp segment 42 is caused to slide across the ball 30, urging the push rod 18 downwardly to select a desired gear shift range in the shift control mechanism below when the lever assembly is pivoted rearwardly or forwardly in the usual manner.

It should be noted in FIG. 2 that when the operating button 16 is fully depressed, the ramp segment 42 enters the cutout portion 17 in a side of the upper edge of the cylindrical shift lever 14, to complete the downward movement of the push rod 18.

Once the operating button 16 is released, the leftward force of the coil spring 68 against the spring seat 70 will urge the assembly 34 and the button 16 to the left in FIG. 2, to return same to the free position shown in FIG. 1.

While the use of the coil spring 68 is satisfactory for some transmission shift control applications, for other applications, in lieu of the coil spring 68, a coil spring mounted at the lower end of the push rod stem 20 is used, as will now be explained.

Figure 9:
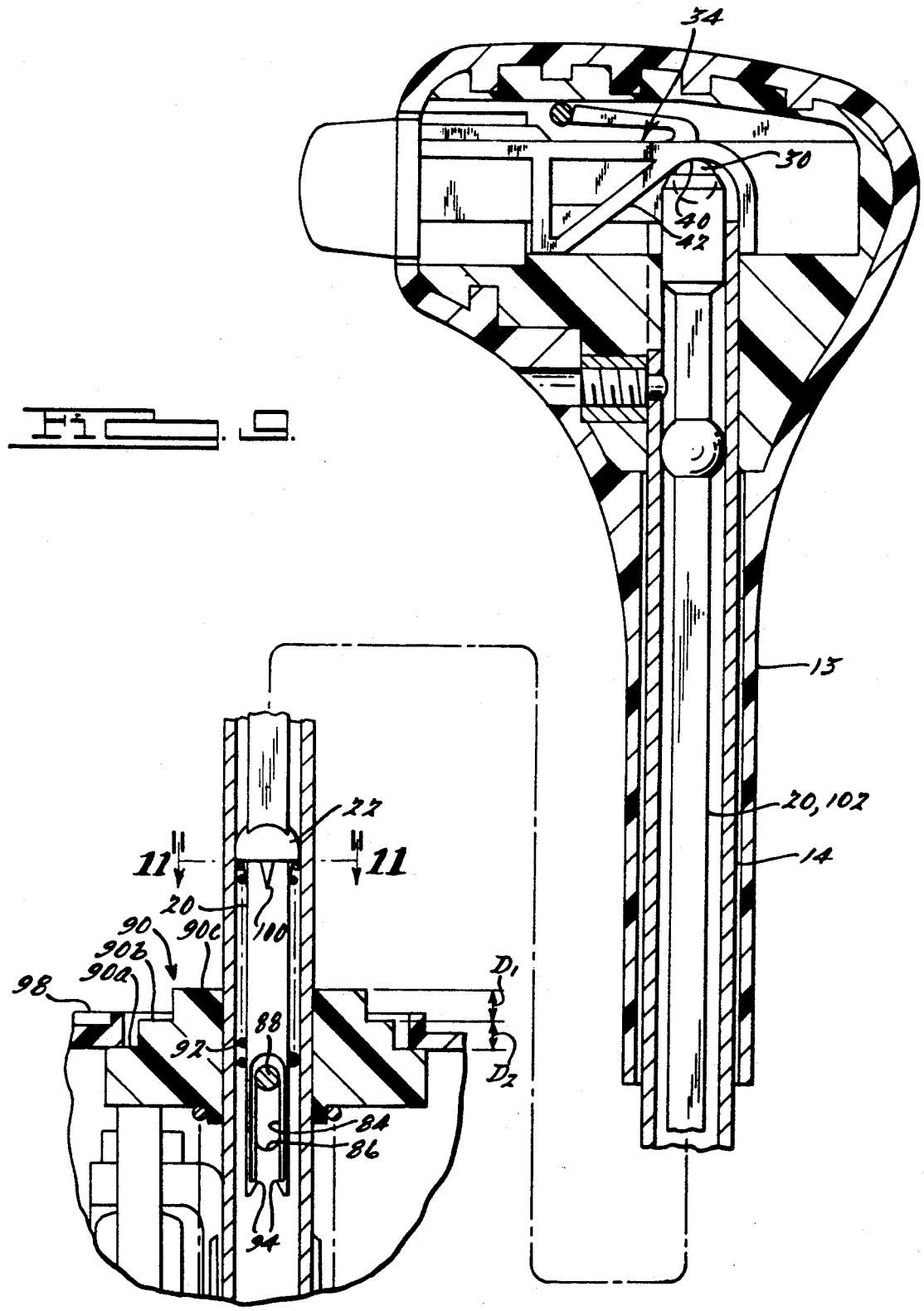
FIG. 9 is a cross-sectional view of the FIG. 1 structure combined with a fragmentary portion of the transmission shift control mechanism to which the shift control lever assembly is operatively connected, and showing an alternate arrangement of a portion of the FIG. 5 structure.

Referring now to FIG. 9, it is noted that, at the lower end of the push rod stem 20, within the cylindrical shift lever 14, a slot 84 is formed therein in the vicinity of oppositely disposed elongated openings 86 formed across the shift lever 14. A shifter pin 88 extends through the openings 86 and thence through the slot 84, and has the extended ends thereof secured in oppositely disposed walls of a stepped member 90, the function and operation of which is explained in application Ser. No. 07/807,819, filed on Dec. 16, 1991, filed concurrently herewith and assigned to the same assignee.

A coil spring 92 is mounted around the lower end of the push rod stem 20 between the shifter pin 88 and the lowermost semi-spherical portion 22 formed on the stem 20.

By virtue of oppositely disposed triangular cross-sectioned edges 94 formed on the inner surfaces that form the slot 84 adjacent the terminal pointed ends 97 thereof, at assembly the push rod stem 20 will automatically align itself with the shifter pin 88 for mounting thereon, prior to being "snapped" thereon by spreading the two sides 96 of the end of the rod 20.

In operation, upon depression of the push rod stem 20 resulting from the manual depression of the operating button 16, explained above, the coil spring 92 is depressed a distance equivalent to $D_1$ or to $D_1$ plus $D_2$, as required, to retain the ball 30 against the surface 40 when the stepped member 90 is selectively moved upwardly through the distances $D_1$ or $D_1$ plus $D_2$ to be positioned for the various shift positions 90a, 90b and 90c within the housing 98, as explained in application Ser. No. 07/807,819.

Figure 10:
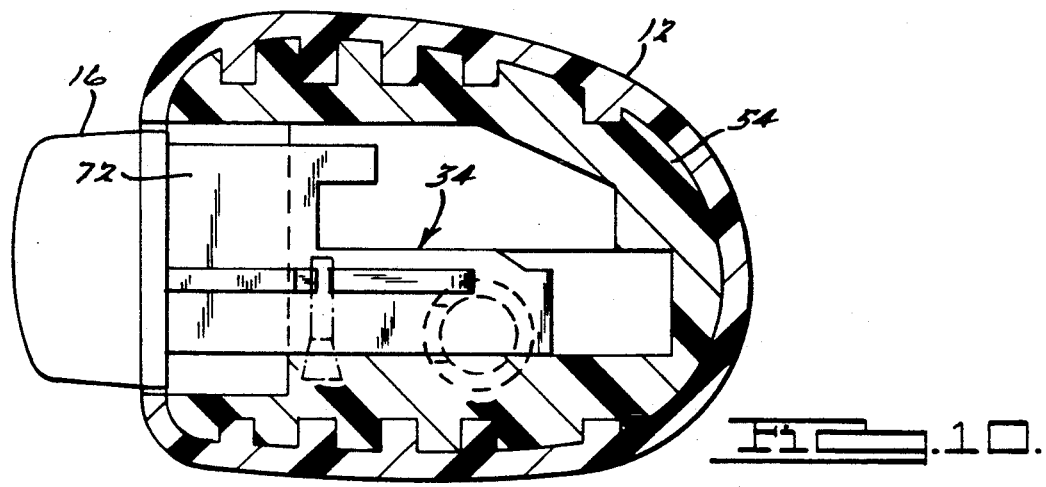
FIG. 10 is a view similar to FIG. 5, illustrating an alternate embodiment of a portion thereof.

It is to be realized that, upon release and, thus, retraction of the push rod stem 20, the coil spring 92 serves to force the stem 20 upwardly, thereby causing the ball 30 at the upper end thereof to roll up the ramp segment 42 to thus cause the assembly 34 and the button 16 to move to the left in FIG. 2, to return same to the free position shown in FIG. 1. As such, the coil spring 68 and the associated seats 69 and 70 shown in FIG. 5 are not required, as illustrated in FIG. 10.

Figure 11:
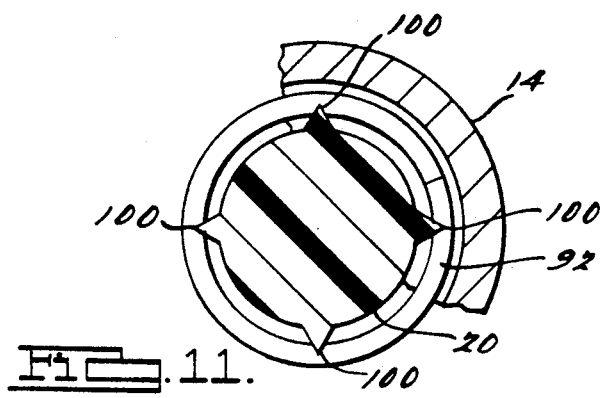
FIG. 11 is an enlarged cross-sectional view taken along the plane of the line 11—11 of FIG. 9 and looking in the direction of the arrows.

FIG. 11 illustrates the shape of the push rod stem 20 just below the semi-spherical portion 22, as having four equally spaced pointed extensions 100 formed therearound, serving to position and retain the coil spring 92 in vertical alignment.

Figure 12:
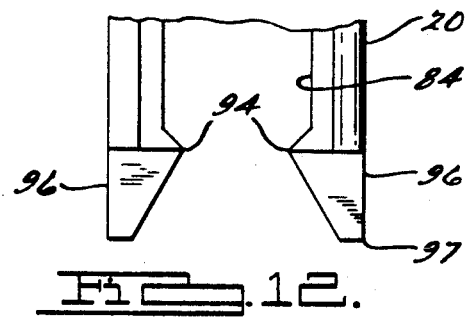
FIG. 12 is an enlarged view of a portion of the FIG. 9 structure.
Figure 13:
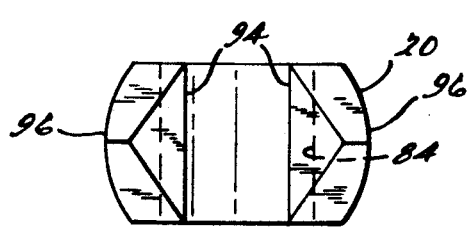
Figure 15:
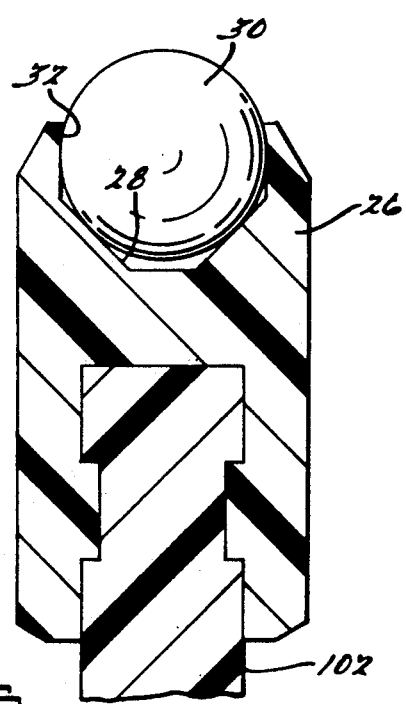
FIG. 15 is a fragmentary cross-sectional view of an alternate embodiment of a portion of the FIG. 1 structure.

FIGS. 12 and 13 illustrate the details of the edges 94 referred to above.

Figure 14:
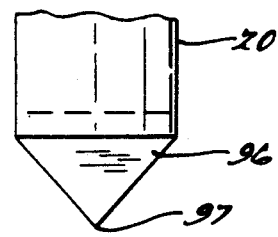
FIGS. 13 and 14 are end and side views, respectively, of the FIG. 12 structure.

FIG. 14 illustrates a modified push rod stem 102 secured to the cylindrical member 26. In this embodiment, the stem 102 is square in cross-section, and formed of a particular glass-filled polyethylene which has low expansion and contraction characteristics. The portion below the semi-spherical portion 22 (FIG. 9), however, is formed with a round cross-section.

INDUSTRIAL APPLICABILITY

It should be apparent that the invention provides an improved shift control lever assembly which is easily actuated and efficient in operation with substantially no internal friction.

While but two general embodiments of the invention have been shown and described, other modifications thereof are possible within the scope of the following claims.

The embodiments of the invention in which an exclusive property or privilege is claimed are as follows:

1. A transmission shift control lever assembly comprising a palm abutting knob and integrally molded hollow stem mounted on and around a fixed elongated cylindrical shift lever, a push rod slidably mounted in the fixed elongated cylindrical shift lever, an integral ball mounting means formed on the upper end of the push rod, a ball rotatably mounted in the integral ball mounting means, an operating button movably mounted in an end of the palm abutting knob, an actuating assembly operatively connected to the operating button and slidably mounted in the palm abutting knob, and a ramp segment formed as part of the actuating assembly adjacent the ball for urging the ball and its associated push rod downwardly upon manual depression of the operating button.

2. The transmission shift control lever assembly described in claim 1, wherein said integral ball mounting means includes a cylindrical portion formed on the upper end of the push rod, and a pocket formed in the upper end of the cylindrical portion, with said ball being rotatably mounted in the pocket.

3. The transmission shift control lever assembly described in claim 1, wherein said actuating assembly includes a flat strip extending laterally from said operating button, said ramp segment being formed to extend downwardly from said flat strip, said ball abutting against the bottom surface of said flat strip adjacent the upper end of said ramp segment prior to manual depression of the operating button.

4. The transmission shift control lever assembly described in claim 3, and an arm formed on an upper surface of said flat strip extending toward said operating button, and a fixed pin mounted on an inner surface of said palm abutting knob, said arm adapted to abut against said fixed pin to retain said actuating assembly and said operating button in place during shipment prior to installation on a shift control mechanism.

5. The transmission shift control lever assembly described in claim 3, and a flat segment formed on a side of said flat strip, a first spring seat formed on an inner edge of said flat segment, a second spring seat formed on an inner wall of said palm abutting knob axially aligned with said first spring seat, a coil spring compressed between said spring seats for urging said operating button outwardly from said palm abutting knob, and a brace segment formed on the inner end of said flat strip adapted to serve as a stop against the upper end of said fixed elongated cylindrical shift lever.

6. The transmission shift control lever assembly described in claim 3, and a slot formed in the lower end of said push rod, a coil spring mounted around the lower end of said push rod within said cylindrical shift lever, a pin mounted through said cylindrical shift lever and said slot, and said coil spring being confined between said pin and a fixed point on said push rod such that the coil spring forces said ball up said ramp segment to thereby urge said operating button outwardly from said palm abutting knob.

7. The transmission shift control lever assembly described in claim 6, and alignment means formed within the slot at the lower end of the push rod for automatically aligning the slot on the pin.

8. The transmission shift control lever assembly described in claim 7, wherein said alignment means includes oppositely disposed triangular cross-sectioned, inwardly extending projections formed on the inner surfaces of the slot adjacent the lower ends thereof.

* * * * *